(12) United States Patent
Semba et al.

(10) Patent No.: US 9,934,803 B1
(45) Date of Patent: Apr. 3, 2018

(54) DATA STORAGE DEVICE ATTENUATING MULTIPLE ACTUATOR COUPLING DISTURBANCE

(71) Applicant: Western Digital Technologies, Inc., San Jose, CA (US)

(72) Inventors: Tetsuo Semba, Zama (JP); Jeffrey J. Dobbek, Gilroy, CA (US); Bryan Rowan, San Jose, CA (US); Masahito Kobayashi, Newport Beach, CA (US); Kevin Tzou, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 14 days.

(21) Appl. No.: 15/585,933

(22) Filed: May 3, 2017

(51) Int. Cl.
*G11B 5/55* (2006.01)
*G11B 5/596* (2006.01)

(52) U.S. Cl.
CPC ............ *G11B 5/5578* (2013.01); *G11B 5/556* (2013.01); *G11B 5/59694* (2013.01)

(58) Field of Classification Search
CPC ............... G11B 5/012; G11B 5/02; G11B 5/5552–5/5565; G11B 5/5578–5/5582; G11B 5/59694
USPC .. 360/55, 69, 75, 77.01–77.08, 78.05, 78.12
See application file for complete search history.

(56) References Cited

U.S. PATENT DOCUMENTS

| | | | | |
|---|---|---|---|---|
| 4,979,055 A | * | 12/1990 | Squires | G11B 27/36 360/69 |
| 5,261,058 A | * | 11/1993 | Squires | G06F 3/0601 360/78.12 |
| 5,274,773 A | * | 12/1993 | Squires | G06F 3/0601 710/38 |
| 5,412,666 A | * | 5/1995 | Squires | G11B 5/5578 714/755 |
| 5,610,808 A | * | 3/1997 | Squires | G11B 5/5578 360/78.12 |
| 5,761,007 A | * | 6/1998 | Price | G11B 5/4813 360/264.4 |
| 6,005,743 A | * | 12/1999 | Price | G11B 21/083 360/78.12 |
| 6,490,138 B1 | | 12/2002 | Prater | |
| 6,493,172 B1 | | 12/2002 | Morris et al. | |
| 6,563,657 B1 | | 5/2003 | Serrano et al. | |
| 6,687,092 B2 | | 2/2004 | Kan et al. | |

(Continued)

FOREIGN PATENT DOCUMENTS

WO 2016053195 A1 7/2016

OTHER PUBLICATIONS

D. Chunling, G. Guo, J. Zhang, "Interaction Rejection of Multiple Microactuators in Dual-Stage Servos for Hard Disk Drives" IEEE Transactions on Control Systems Technology, vol. 14, No. 3, May 2006.

*Primary Examiner* — Joseph Feild
*Assistant Examiner* — James L Habermehl (57) ABSTRACT

A data storage device is disclosed comprising a first actuator configured to actuate a first head over a first disk, and a second actuator configured to actuate a second head over a second disk. The first actuator is controlled based on a first feed-forward seek profile to seek the first head over the first disk, and the second actuator is controlled to position the second head over a second data track on the second disk including to process the first feed-forward seek profile to attenuate a coupling disturbance from the first actuator.

24 Claims, 6 Drawing Sheets

(56) References Cited

U.S. PATENT DOCUMENTS

| | | |
|---|---|---|
| 6,747,836 B2 | 6/2004 | Stevens et al. |
| 6,765,743 B2 | 7/2004 | Goodman et al. |
| 6,952,322 B1 | 10/2005 | Codilian et al. |
| 7,102,842 B1 * | 9/2006 | Howard ............... G11B 5/5521 360/78.12 |
| 7,206,162 B2 * | 4/2007 | Semba ................ G11B 5/5547 360/77.01 |
| 7,245,448 B2 | 7/2007 | Urata |
| 7,271,976 B2 * | 9/2007 | Ishii .................... G11B 5/5547 360/75 |
| 7,277,258 B2 | 10/2007 | Hirano et al. |
| 7,486,470 B1 | 2/2009 | Semba |
| 8,743,503 B1 | 6/2014 | Tang et al. |
| 8,896,955 B1 | 11/2014 | Chen et al. |
| 9,147,419 B2 | 9/2015 | Berg et al. |
| 9,361,919 B1 * | 6/2016 | Lieu ...................... G11B 5/556 |
| 2004/0004781 A1 | 1/2004 | Kobayashi et al. |
| 2007/0183076 A1 | 8/2007 | Baugh et al. |

\* cited by examiner

DATA STORAGE DEVICE ATTENUATING MULTIPLE ACTUATOR COUPLING DISTURBANCE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
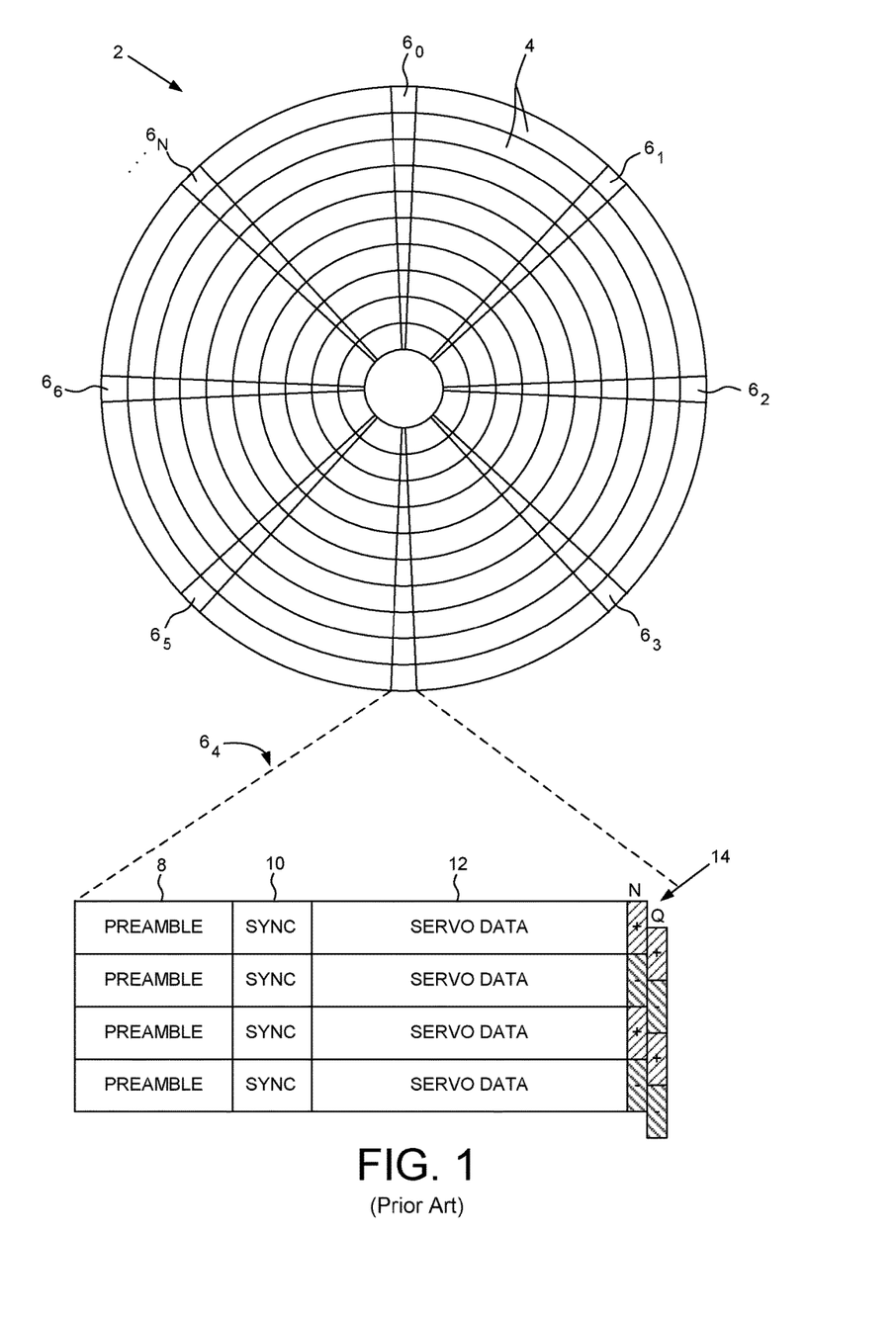
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
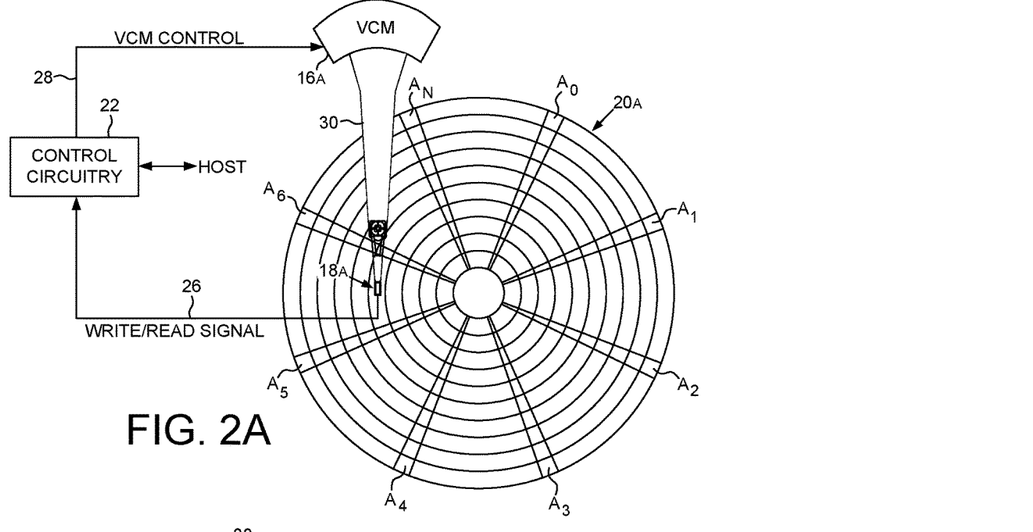
FIGS. 2A and 2B show a data storage device in the form of a disk drive comprising plurality of disks and a multi-actuator servo system for actuating respective heads over each disk surface.
Figure 2B:
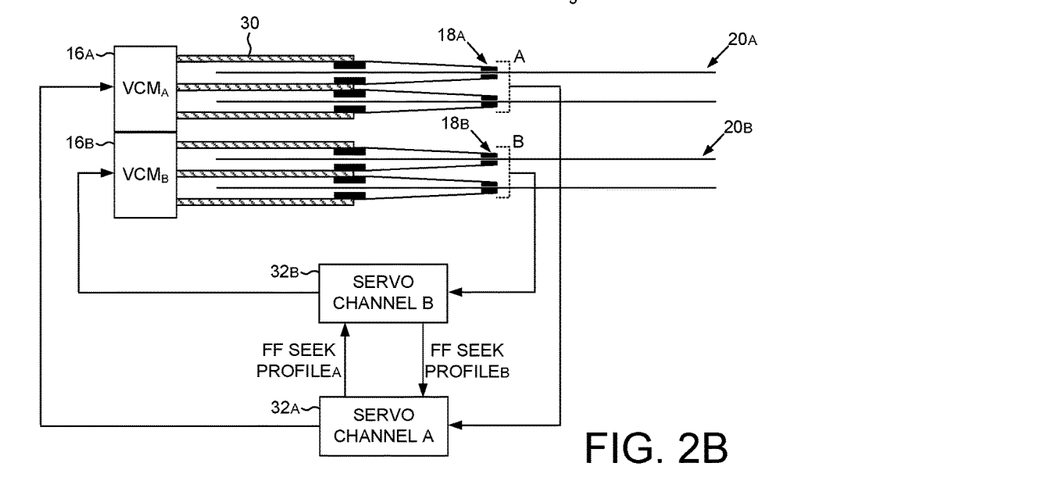
Figure 2C:
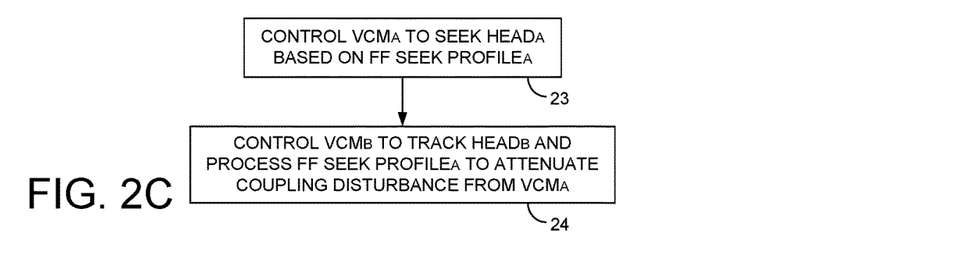
FIG. 2C is a flow diagram according to an embodiment wherein when controlling a first actuator to seek a first head over a first disk based on a feed-forward seek profile, a coupling disturbance affecting a second actuator is attenuated.

FIGS. 2A and 2B show a data storage device in the form a disk drive according to an embodiment. A first actuator $16_A$ is configured to actuate a first head $18_A$ over a first disk $20_A$, and a second actuator $16_B$ is configured to actuate a second head $18_B$ over a second disk $20_B$. The disk drive further comprises control circuitry 22 configured to execute the flow diagram of FIG. 2C, wherein the first actuator is controlled based on a first feed-forward seek profile to seek the first head over the first disk (block 23), and the second actuator is controlled to position the second head over a second data track on the second disk including to process the first feed-forward seek profile to attenuate a coupling disturbance from the first actuator (block 24).

In the embodiment of FIG. 2A, each disk comprises a plurality of servo sectors $A_0$-$A_N$ that define a plurality of servo tracks, wherein data tracks are defined relative to the servo tracks at the same or different radial density. The control circuitry 22 processes a read signal 26 emanating from the respective head to demodulate the servo sectors and generate a position error signal (PES) representing an error between the actual position of the head and a target position relative to a target track. A servo control system in the control circuitry 22 filters the PES using a suitable compensation filter to generate a control signal 28 applied to a voice coil motor (VCM) $16_A$ which rotates an actuator arm 30 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

Any suitable actuators may be employed to actuate the heads over the respective disks. In the embodiment of FIG. 2B, the first actuator $16_A$ comprises a first $VCM_A$ and the second actuator $16_B$ comprises a second $VCM_B$ which rotate respective actuator arms about a common shaft. In the example of FIG. 2B, each VCM rotates three actuator arms about the common pivot so as to actuator eight heads over respective disk surfaces (four for each actuator). However, other embodiments may employ any suitable number of VCMs which may rotate any suitable number of actuator arms about the common pivot. Also in the embodiment of FIG. 2B, a first servo channel $32_A$ controls the first actuator $16_A$ and a second servo channel $32_B$ controls the second actuator $16_B$, wherein the servo channels may be implemented in separate integrated circuits, or in the same integrated circuit.

Figure 3A:
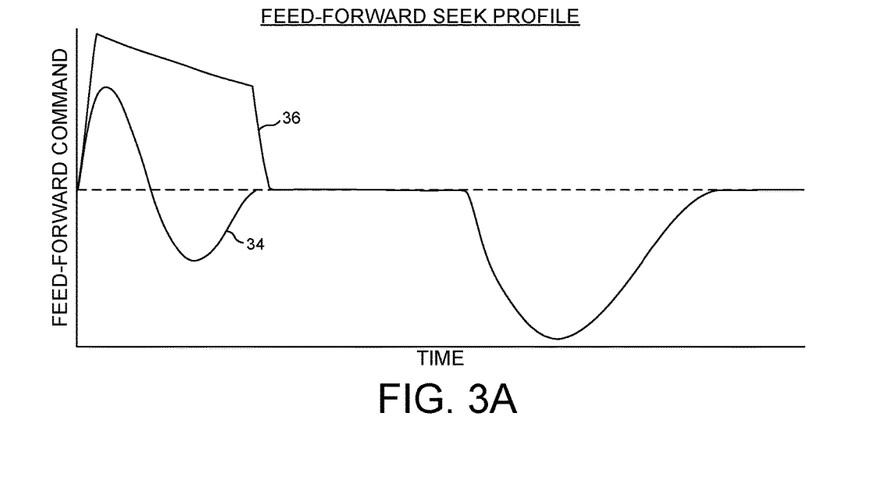
FIG. 3A shows example feed-forward seek profiles for a long seek and a short seek for a first head.
Figure 3B:
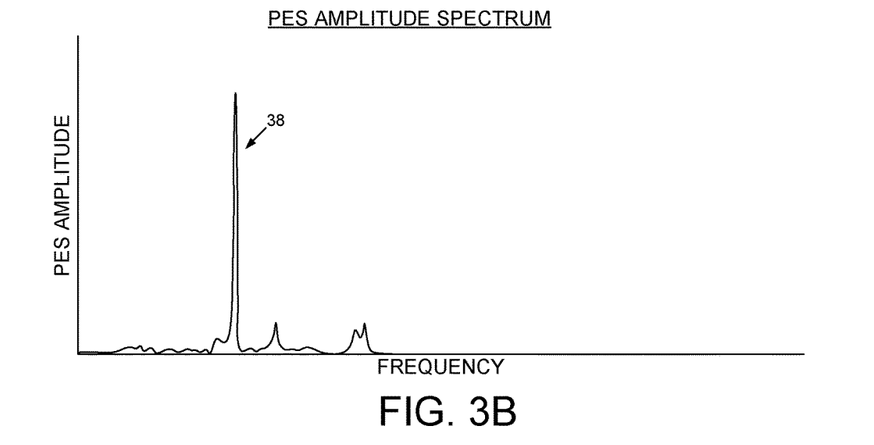
FIG. 3B shows an amplitude frequency spectrum of a position error signal (PES) when tracking a second head including the coupling disturbance caused by seeking a first head over the first disk according to an embodiment.

FIG. 3A shows example feed-forward seek profiles applied to the first actuator in order to seek the first head over the first disk toward a target servo track, including seek profile 34 corresponding to a long seek and seek profile 36 corresponding to a short seek. FIG. 3B shows an example amplitude frequency spectrum of the PES generated within the second servo channel $32_B$ when tracking the second head over a target data track, including a coupling disturbance 38 caused by concurrently seeking the first head over the first disk. In embodiments described below, the coupling disturbance 38 shown in FIG. 3B may be attenuated in the second servo channel $32_B$ by filtering the feed-forward seek profile with a coupling model comprising a bandpass filter having a gain and frequency configured to attenuate the coupling disturbance 38.

Figure 4A:
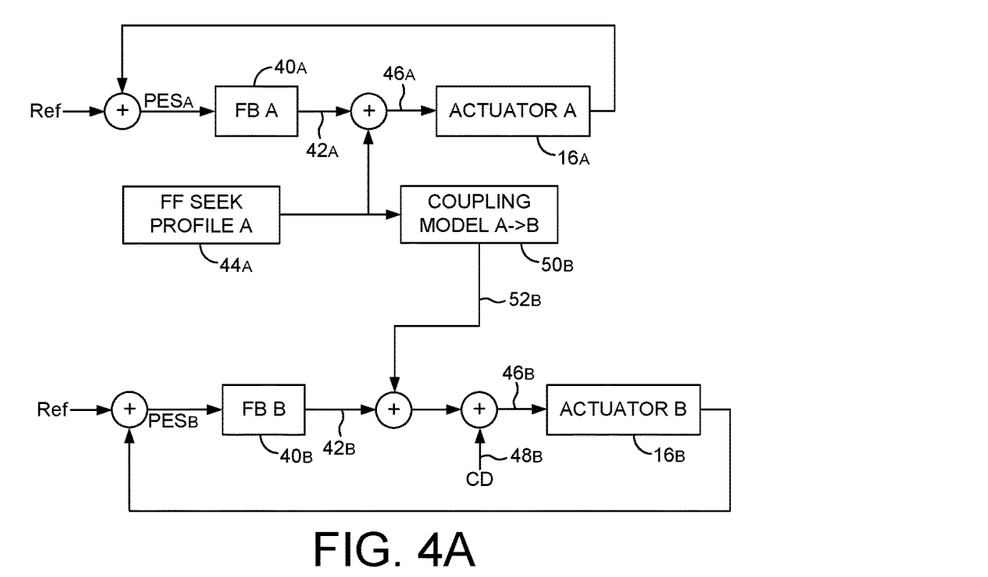
FIG. 4A shows an embodiment wherein the feed-forward seek profile for a first head is filtered by a coupling model to attenuate a coupling disturbance affecting a second head.

FIG. 4A shows an embodiment wherein the control circuitry comprises a first servo loop for controlling the first actuator $16_A$ and a second servo loop for controlling the second actuator $16_B$. The first servo loop comprises a first feedback controller $40_A$ configured to filter the $PES_A$ to generate a first command value $42_A$, and the second servo loop comprises a second feedback controller $40_B$ configured to filter the $PES_B$ to generate a second command value $42_B$. When seeking the first head over the first disk, values from a first feed-forward seek profile $44_A$ are added to the first command value $42_A$ to generate a first control signal $46_A$ applied to the first actuator $16_A$. This seek operation of the first head $18_A$ induces a coupling disturbance $48_B$ affecting the tracking operation of the second head $18_B$, wherein in FIG. 4A the coupling disturbance $48_B$ is modeled as being added to the second control signal $46_B$ that controls the second actuator $16_B$. In order to attenuate the effect of the coupling disturbance $48_B$, the feed-forward seek profile $44_A$ is filtered with a second coupling model $50_B$ to generate a second coupling value $52_B$ representing the coupling disturbance $48_B$ caused by actuating the first actuator $16_A$. The second command value $42_B$ output by the second feedback controller $40_B$ is modified based on the second coupling value $52_B$ in order to attenuate the coupling disturbance $48_B$, and the resulting control signal $46_B$ is used to control the second actuator $16_B$ while tracking a second data track on the second disk.

Figure 4B:
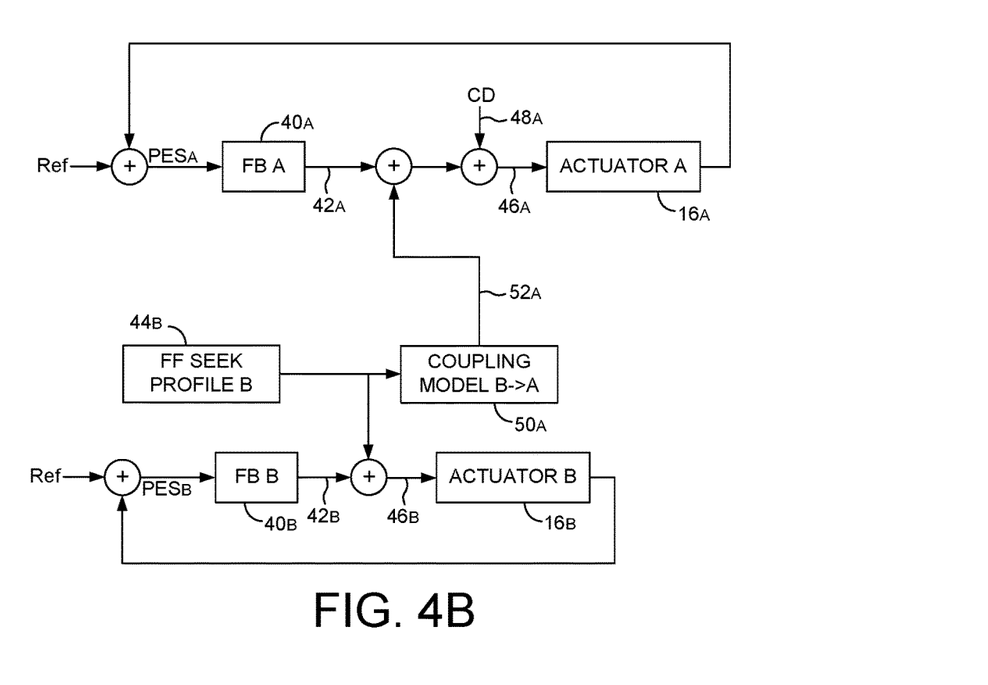
FIG. 4B shows an embodiment wherein the feed-forward seek profile for a second head is filtered by a coupling model to attenuate a coupling disturbance affecting a first head.

FIG. 4B shows an embodiment wherein the first servo loop for controlling the first actuator $16_A$ during a tracking operation comprises a first coupling model $50_A$ configured to filter a second feed-forward seek profile $44_B$ used to control the second actuator $16_B$ during a seek operation. In this embodiment, the first coupling value $52_A$ generated by the first coupling model $50_A$ attenuates a coupling disturbance $48_A$ caused by seeking the second head over the second disk.

Any suitable technique may be employed to configure the first and second coupling models $50_A$ and $50_B$ in order to attenuate the respective coupling disturbances. In one embodiment, a nominal coupling model may be determined theoretically based on the known parameters of the servo systems, or heuristically by evaluating a subset of disk drives and the effect that the coupling disturbance has on each actuator. The nominal coupling models may then be loaded into each production disk drive during manufacturing. In another embodiment, the coupling models for each production disk drive may be determined by executing a suitable calibration procedure that measures the coupling disturbances and corresponding transfer functions. In yet another embodiment, once a nominal or calibrated coupling model has been determined, it may be further optimized by adapting the coupling model, for example, during a calibration interval or during normal access operations while the disk drive is deployed in the field.

Figure 5A:
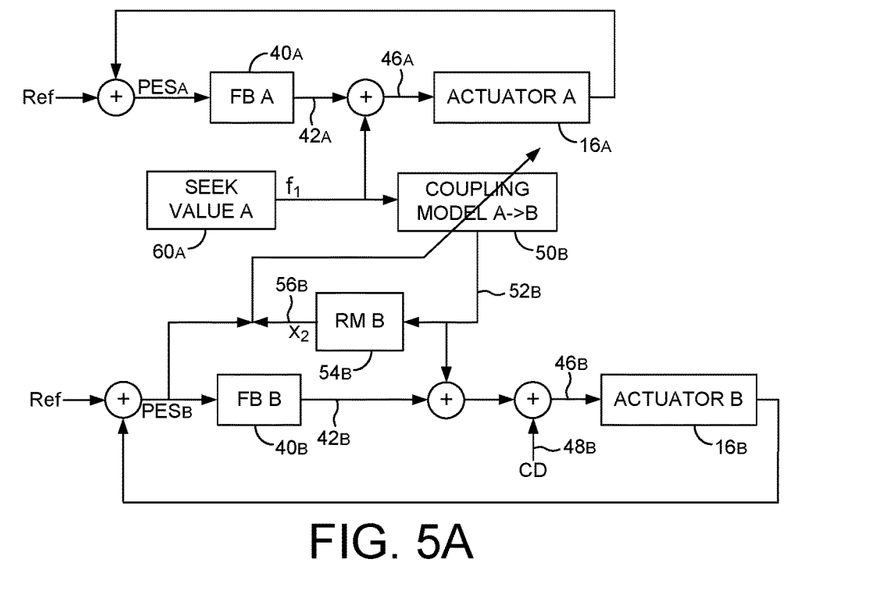
FIG. 5A shows an embodiment wherein the coupling model for a second head is adapted based on the measured PES of the second head and an estimated PES generated by filtering the output of the coupling model with a rejection model of the second servo loop.
Figure 5B:
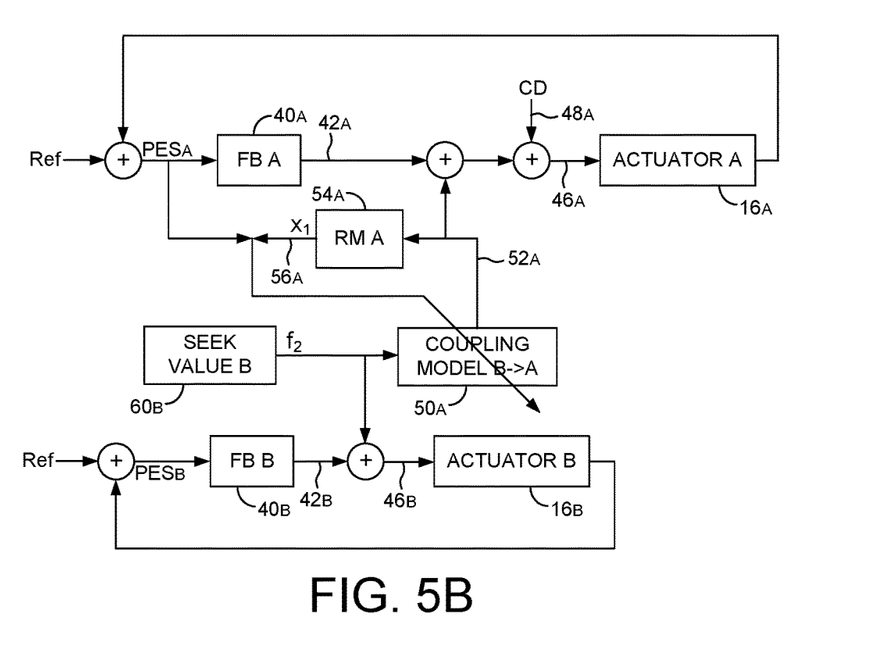
FIG. 5B shows an embodiment wherein the coupling model for a first head is adapted based on the measured PES of the first head and an estimated PES generated by filtering the output of the coupling model with a rejection model of the first servo loop.

FIG. 5A shows an embodiment for adapting the second coupling model $50_B$ of the second servo loop. The second coupling value $52_B$ is filtered with a second rejection model 54B of the second servo loop to generate an estimated $PES_B$ $56_B$ representing the effect of the coupling disturbance $48_B$ while seeking the first head using the first servo loop. The estimated $PES_B$ $56_B$ and the measured $PES_B$ are processed to adapt the second coupling model $50_B$. In the embodiment of FIG. 5A, a seek value $60_A$ used to seek the first head over the first disk is filtered by the second coupling model $50_B$, wherein the seek value $60_A$ may represent any suitable value, such as a value from a feed-forward seek profile as described above, or a command value representing the first control signal $46_A$ for controlling the first actuator $16_A$. FIG. 5B shows a similar embodiment for adapting the first coupling model $50_A$ of the first servo loop based on an estimated $PES_A$ $56_A$ and the measured $PES_A$.

Figure 6:
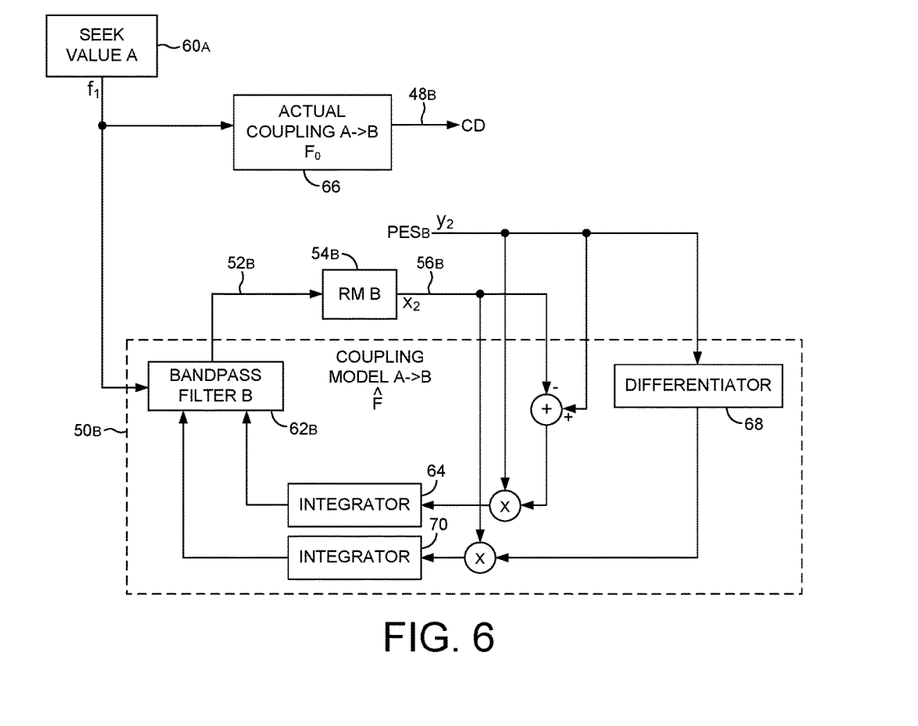
FIG. 6 shows an embodiment for adapting the gain and center frequency of a bandpass filter in the second servo loop coupling model.

FIG. 6 shows an embodiment of the second coupling model $50_B$ for attenuating the coupling disturbance $48_B$ caused by seeking the first head over the first disk while tracking the second head over the second disk. In this embodiment, the second coupling model $50_B$ comprises a bandpass filter $62_B$ comprising a gain and center frequency that are adapted relative to a gain and frequency of the dominant frequency component of the coupling disturbance $48_B$ such as shown in FIG. 3B. In other embodiments, the second coupling model $50_B$ may comprise multiple bandpass filters each tuned to attenuate a particular frequency component of the coupling disturbance.

In one embodiment, the gain and center frequency of the bandpass filter $62_B$ in FIG. 6 are adapted so as to minimize the $PES_B$. Referring again to FIG. 5A, the $PES_B$ may be represented as:

$$e(n)=PSd_2(n)-PSK_g\hat{F}f_1(n)$$

where P represents the transfer function of the second actuator $16_B$, $d_2$ represents the coupling disturbance $48_B$, $\hat{F}$ represents the transfer function of the second coupling model $50_B$, $K_g$ represents a gain of the coupling model $50_B$, $f_1(n)$ represents the first seek value $60_A$, and S represents the error rejection curve of the second servo loop:

$$\frac{1}{1+PC}$$

where C represents the transfer function of the second feedback controller $40_B$. The $PES_B$ can be minimized by adapting the gain $K_g$ according to:

$$\frac{\partial e(n)^2}{\partial K_g} = -2e(n)PSFf_1(n) = -2e(n)x_2(n)$$

where:

$$x_2(n)=P\,S\,F\,f_1(n)$$

and P S represents the second rejection model $54_B$. The gain $K_g$ may then be adapted according to:

$$K_g(n+1) = \gamma K_g(n) - \mu\frac{\partial e(n)^2}{\partial K_g}$$

$$K_g(n+1) = \gamma K_g(n) + 2\mu e(n)x_2(n)$$

where $\gamma$ and $\mu$ are suitable learning coefficients. In one embodiment shown in FIG. 6, the gain update value $e(n)x_2(n)$ is integrated 64 to generate an integrated gain update value.

In one embodiment, the bandpass filter $62_B$ in FIG. 6 is a second order bandpass filter of the form:

$$\hat{F}(z) = \frac{b_0 z^2 + b_1 z + b_2}{z^2 + a_1 z + a_2}$$

having a center frequency $\omega_0$ defined as:

$$a_1 = -2e^{-\gamma \omega_0 T_S} \cos\left(\sqrt{1-\gamma^2}\,\omega_0 T_s\right)$$

which can be approximated as:

$$a_1 = \overline{a_1} + K_f \omega_0$$

Assuming the dominant frequency component of the coupling disturbance changes slowly, the gain adaption is near optimum ($K_g \approx 1$), and there is no sharp change in the actuator sensitivity functions near the center frequency ($P(\omega_0)S(\omega_0) \approx P(\omega)(S(\omega))$), then the dominant component of the $PES_B$ may be represented as:

$$y_2(n) = P\,S\,F_0 f_1(n) - P\,S\hat{F} f_1(n)$$

where $F_0$ represents the transfer function 66 that generates the actual coupling disturbance $48_B$ as shown in FIG. 6. Near the center frequency:

$$y_2(\omega) = P(\omega_0)S(\omega_0)F_0(\omega_0)f_1(\omega) + x_2(\omega)$$

where $x_2(\omega)$ represents the output $56_B$ of the second rejection model $54_B$:

$$x_2(\omega) = P(\omega_0)S(\omega_0)\hat{F}(\omega)f_1(\omega)$$

Referring again to FIG. 6, applying a differentiator 68 to $y_2(n)$ and multiplying by $x_2$ for a period longer than the servo sample interval the error may be represented as:

$$e(k) = \int_{(k-1)T}^{kT} \frac{d}{dt} y_2(t) \cdot x_2(t) dt$$

$$e(k) = \int \frac{d}{dt} x_2(t) \cdot x_2(t) dt + \int \frac{d}{dt} PS(\omega_0)F_0(\omega_0)f_1(t) \cdot PS(\omega_0)\hat{F}(\omega_0)f_1(t) dt$$

Since the first term in the above equation is zero, the error may be represented as:

$$e(k) = PS(\omega_0)^2 \int \frac{d}{dt} F_0(\omega_0)f_1(t) \cdot \hat{F}(\omega_0)f_1(t) dt$$

Because $f_1(t)$ is a single tone at the center frequency $\omega_0$, when the second coupling model $\hat{F}$ is exact the phase error between $F_0(\omega_0)f_1(t)$ and $\hat{F}(\omega_0)f_1(t)$ is zero and the phase error between $$\frac{d}{dt} F_0(\omega_0)f_1(t)$$

and $\hat{F}_0(\omega_0)f_1(t)$ is 90 degrees. When the second coupling model $\hat{F}$ has a center frequency offset $\Delta\omega$ from the actual coupling transfer function $F_0$:

$$\frac{d}{dt} F_0(\omega_0)f_1(t) \cdot \hat{F}(\omega_0)f_1(t) = \omega_0 |F_0(\omega_0)| e^{j2\omega_0 t + \frac{\pi}{2} + j\Delta\omega t} |f_1|^2$$

When the phase delay of the second coupling model $\hat{F}$ is zero at the center frequency, $e^{j2\omega_0 t}$ is unity and:

$$\text{real}(e) \geq 0 \text{ at } \Delta\omega \geq 0$$

$$\text{real}(e) < 0 \text{ at } \Delta\omega < 0$$

Since the coefficient of the coupling model is approximately proportional to the center frequency:

$$a_1 = \overline{a_1} + K_f \omega_0$$

the center frequency of the bandpass filter $62_B$ in FIG. 6 may be updated according to:

$$a_1(k) = a_1(k-1) + \mu e(k)$$

where $$e(k) = \int_{(k-1)T}^{kT} \frac{d}{dt} y_2(t) \cdot x_2(t) dt$$

and $\mu$ is a suitable learning coefficient. The above equation for updating the center frequency of the bandpass filter $62_B$ is implemented in FIG. 6 with a differentiator 68 for differentiating $y_2(t)$, and an integrator 70 for integrating the product:

$$\frac{d}{dt} y_2(t) \cdot x_2(t).$$

In one embodiment, the control circuitry may adapt the gain $K_g$ of the bandpass filter $62_B$ in FIG. 6 for different operating conditions, such as different ambient temperatures, different heads, or different zones across the same disk. The adapted gains $K_g$ for each operating condition may be stored in a table, and when the operating conditions change during normal operation, the control circuitry may initialize the bandpass filter $62_B$ with the previously adapted gain $K_g$ stored in the table. For example, when there is a head switch the control circuitry may initialize the bandpass filter $62_B$ with the gain $K_g$ corresponding to the newly selected head. In one embodiment, the control circuitry may continue adapting the gain $K_g$ for the selected head and when there is another head switch, replace the gain $K_g$ in the table for the current head and initialize the bandpass filter $62_B$ with the gain $K_g$ for the newly selected head.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a first actuator configured to actuate a first head over a first disk;
    a second actuator configured to actuate a second head over a second disk; and
    control circuitry configured to:
    control the first actuator based on a first feed-forward seek profile to seek the first head over the first disk; and
    control the second actuator to position the second head over a second data track on the second disk including to process the first feed-forward seek profile to attenuate a coupling disturbance from the first actuator.

2. The data storage device as recited in claim 1, wherein the control circuitry is further configured to:
    filter the first feed-forward seek profile with a second coupling model to generate a second coupling value representing a coupling disturbance caused by controlling the first actuator;
    generate a second position error signal (PES) representing a position of the second head over the second disk relative to the second data track;
    generate a second command value by processing the second PES with a second feedback compensator;
    modify the second command value based on the second coupling value; and
    control the second actuator to position the second head over the second data track based on the modified second command value.

3. The data storage device as recited in claim 2, wherein the second coupling model comprises a bandpass filter.

4. The data storage device as recited in claim 3, wherein the control circuitry is further configured to adapt at least one of a gain and a center frequency of the bandpass filter based on at least the second PES.

5. The data storage device as recited in claim 1, wherein the control circuitry is further configured to:
    control the second actuator based on a second feed-forward seek profile to seek the second head over the second disk; and
    control the first actuator to position the first head over a first data track on the first disk including to process the second feed-forward seek profile to attenuate a coupling disturbance from the second actuator.

6. A data storage device comprising:
    a first actuator configured to actuate a first head over a first disk;
    a second actuator configured to actuate a second head over a second disk; and
    control circuitry configured to:
    control the first actuator based on a first seek value to seek the first head over the first disk;
    filter the first seek value with a second coupling model to generate a second coupling value representing a coupling disturbance from the first actuator;
    generate a second position error signal (PES) representing a position of the second head relative to a second data track on the second disk;
    generate a second command value by processing the second PES with a second feedback compensator;
    modify the second command value based on the second coupling value;
    control the second actuator to position the second head over the second data track based on the modified second command value;
    filter the second coupling value with a second rejection model of a second servo loop configured to control the second actuator, wherein the second servo loop comprises the second feedback compensator; and
    adapt the second coupling model based on an output of the second rejection model and the second PES.

7. The data storage device as recited in claim 6, wherein the second coupling model comprises a bandpass filter.

8. The data storage device as recited in claim 7, wherein the control circuitry is further configured to adapt at least one of a gain and a center frequency of the bandpass filter based on the output of the second rejection model and the second PES.

9. The data storage device as recited in claim 8, wherein the control circuitry is further configured to adapt the gain of the bandpass filter based on a difference between the output of the second rejection model and the second PES.

10. The data storage device as recited in claim 9, wherein the control circuitry is further configured to:
multiply the difference between the output of the second rejection model and the second PES by the second PES to generate a gain update value;
integrate the gain update value; and
adapt the gain of the bandpass filter based on the integrated gain update value.

11. The data storage device as recited in claim 9, wherein the control circuitry is further configured to:
differentiate the second PES to generate a differentiated value;
multiply the differential value by the output of the second rejection model to generate a center frequency update value;
integrate the center frequency update value; and
adapt the center frequency of the bandpass filter based on the integrated center frequency update value.

12. The data storage device as recited in claim 6, wherein the control circuitry is further configured to:
control the second actuator based on a second seek value to seek the second head over the second disk;
filter the second seek value with a first coupling model to generate a first coupling value representing a coupling disturbance from the second actuator;
generate a first position error signal (PES) representing a position of the first head relative to a first data track on the first disk;
generate a first command value by processing the first PES with a first feedback compensator;
modify the first command value based on the first coupling value;
control the first actuator to position the first head over the first data track based on the modified first command value;
filter the first coupling value with a first rejection model of a first servo loop configured to control the first actuator, wherein the first servo loop comprises the first feedback compensator; and
adapt the first coupling model based on an output of the first rejection model and the first PES.

13. A method of operating a data storage device, the method comprising:
controlling a first actuator based on a first feed-forward seek profile to seek a first head over a first disk; and
controlling a second actuator to position a second head over a second data track on a second disk including to process the first feed-forward seek profile to attenuate a coupling disturbance from the first actuator.

14. The method as recited in claim 13, further comprising:
filtering the first feed-forward seek profile with a second coupling model to generate a second coupling value representing a coupling disturbance caused by controlling the first actuator;
generating a second position error signal (PES) representing a position of the second head over the second disk relative to the second data track;
generating a second command value by processing the second PES with a second feedback compensator;
modifying the second command value based on the second coupling value; and
controlling a second actuator to position the second head over the second data track based on the modified second command value.

15. The method as recited in claim 14, wherein the second coupling model comprises a bandpass filter.

16. The method as recited in claim 15, further comprising adapting at least one of a gain and a center frequency of the bandpass filter based on at least the second PES.

17. The method as recited in claim 13, further comprising:
controlling a second actuator based on a second feed-forward seek profile to seek the second head over the second disk; and
controlling the first actuator to position the first head over a first data track on the first disk including to process the second feed-forward seek profile to attenuate a coupling disturbance from the second actuator.

18. A method of operating a data storage device, the method comprising:
controlling a first actuator based on a first seek value to seek a first head over a first disk;
filtering the first seek value with a second coupling model to generate a second coupling value representing a coupling disturbance from the first actuator;
generating a second position error signal (PES) representing a position of a second head relative to a second data track on a second disk;
generating a second command value by processing the second PES with a second feedback compensator;
modifying the second command value based on the second coupling value;
controlling a second actuator to position the second head over the second data track based on the modified second command value;
filtering the second coupling value with a second rejection model of a second servo loop configured to control the second actuator, wherein the second servo loop comprises the second feedback compensator; and
adapting the second coupling model based on an output of the second rejection model and the second PES.

19. The method as recited in claim 18, wherein the second coupling model comprises a bandpass filter.

20. The method as recited in claim 19, further comprising adapting at least one of a gain and a center frequency of the bandpass filter based on the output of the second rejection model and the second PES.

21. The method as recited in claim 20, further comprising adapting the gain of the bandpass filter based on a difference between the output of the second rejection model and the second PES.

22. The method as recited in claim 21, further comprising:
multiplying the difference between the output of the second rejection model and the second PES by the second PES to generate a gain update value;
integrating the gain update value; and
adapting the gain of the bandpass filter based on the integrated gain update value.

23. The method as recited in claim 21, further comprising:
differentiating the second PES to generate a differentiated value;
multiplying the differential value by the output of the second rejection model to generate a center frequency update value;
integrating the center frequency update value; and
adapting the center frequency of the bandpass filter based on the integrated center frequency update value.

24. The method as recited in claim 18, further comprising:
controlling the second actuator based on a second seek value to seek the second head over the second disk;
filtering the second seek value with a first coupling model to generate a first coupling value representing a coupling disturbance from the second actuator;

generating a first position error signal (PES) representing a position of the first head relative to a first data track on the first disk;
generating a first command value by processing the first PES with a first feedback compensator;
modifying the first command value based on the first coupling value;
controlling the first actuator to position the first head over the first data track based on the modified first command value;
filtering the first coupling value with a first rejection model of a first servo loop configured to control the first actuator, wherein the first servo loop comprises the first feedback compensator; and
adapting the first coupling model based on an output of the first rejection model and the first PES.

* * * * *